April 6, 1965 K. M. ALLEN ETAL 3,176,834
VIBRATING CONVEYOR WITH SUSPENDED ADJUSTING FRAME
AND CANTILEVER SUPPORTED UNBALANCING ROTOR
Filed March 23, 1961 3 Sheets-Sheet 2

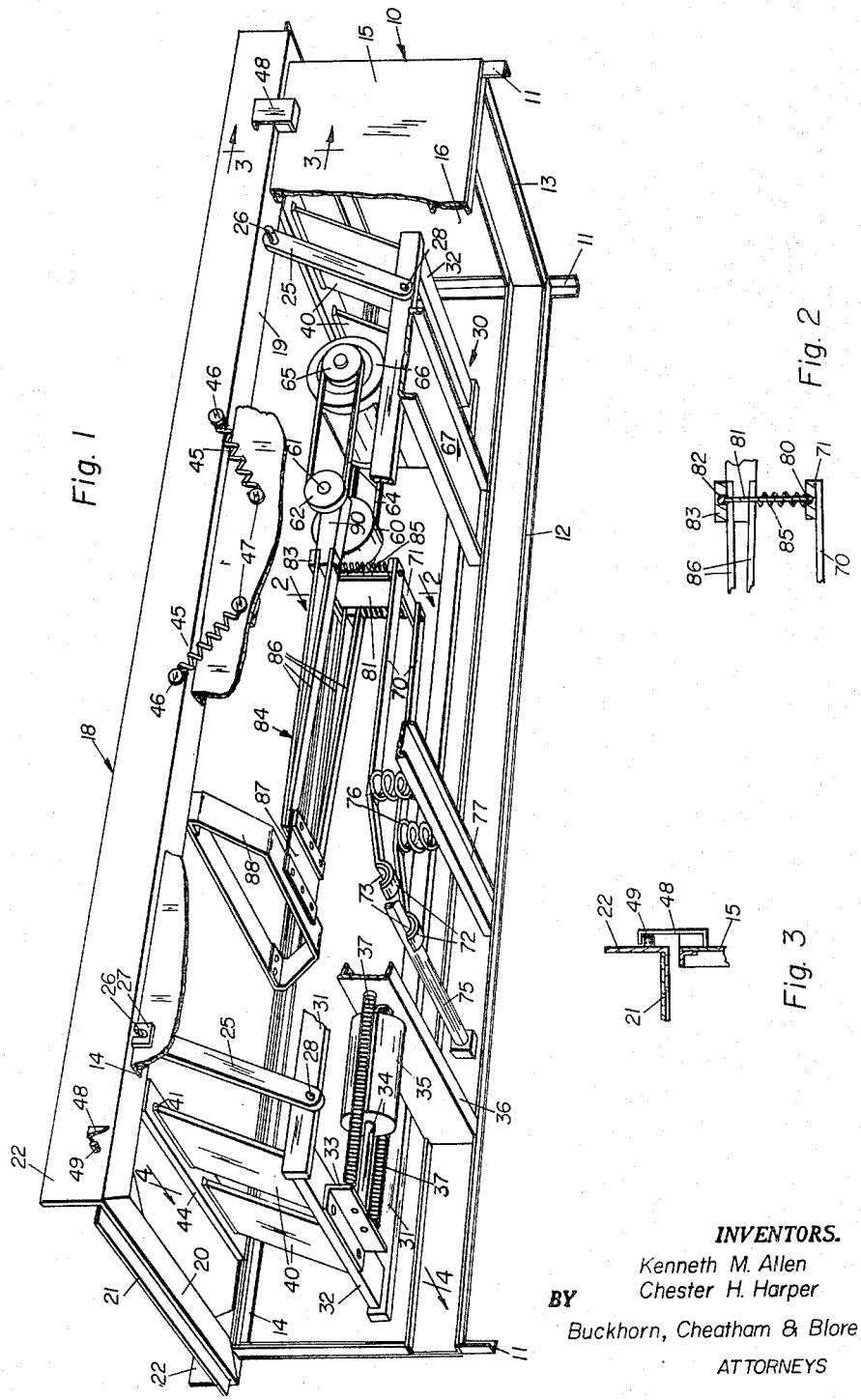

INVENTORS
Kenneth M. Allen
Chester H. Harper
BY
Buckhorn, Cheatham & Blore
ATTORNEYS April 6, 1965     K. M. ALLEN ETAL     3,176,834
VIBRATING CONVEYOR WITH SUSPENDED ADJUSTING FRAME
AND CANTILEVER SUPPORTED UNBALANCING ROTOR
Filed March 23, 1961     3 Sheets-Sheet 3

INVENTORS.
Kenneth M. Allen
Chester H. Harper
BY
Buckhorn, Cheatham & Blore
ATTORNEYS United States Patent Office 3,176,834
Patented Apr. 6, 1965

3,176,834
VIBRATING CONVEYOR WITH SUSPENDED ADJUSTING FRAME AND CANTILEVER SUPPORTED UNBALANCING ROTOR
Kenneth M. Allen and Chester H. Harper, Newberg, Oreg., assignors to Allen-Harper, Inc., Portland, Oreg., a corporation of Oregon
Filed Mar. 23, 1961, Ser. No. 97,814
17 Claims. (Cl. 198—220)

Our present invention comprises an improvement in vibrating conveyors such as disclosed and claimed in our Patent No. 2,899,044 issued August 11, 1959, and in our co-pending application Serial No. 56,394, Patent No. 3,080,961, filed September 16, 1960. A principal feature of the present invention is a resilient unbalancing rotor support which may be used in connection with conveying elements supported as disclosed in the above-identified patent and application. However, a further principal feature of the present invention comprises means for so mounting the conveying element that adjustments of conveying speed and reversal of feeding movement thereof may be accomplished smoothly.

As disclosed in the above-identified application, the conveying element remains stationary when the links which support the conveying element are angularly shifted by moving a subframe pivotally connected to the lower ends thereof. This subframe is slidably mounted upon a fixed frame, and static friction tends to hold the subframe immobile when it is desired to have it adjustably shifted. In the present invention static friction is substantially eliminated, so that adjustments may be smoothly accomplished.

The foregoing adjustments may be accomplished in conveying mechanisms having the feeding element mounted in accordance with the present disclosure, and in which unbalancing rotors as disclosed and claimed in the above-identified patent are employed. However, it is particularly pointed out that the unbalancing rotor disclosed and claimed in our co-pending application, Serial No. 97,818, Patent No. 3,122,930, filed concurrently herewith, provides for improved operation and permits the use of lighter main frames and other elements. The use of such a rotor also permits the assembly to be supported without massive bases and tie-down means.

The resilient rotor supporting assembly disclosed and claimed herein may be used in vibrating conveyors of the types disclosed in the above-identified patent, but it is pointed out that the feeding element suspension means and the unbalancing rotor supporting means herein disclosed cooperate to provide an unusually quiet, smoothly operating vibratory conveyor due to the filtering out and suppression of the transmission of unwanted vertical vibrations to the frame of the machine and also due to the balancing of the horizontal reaction forces of the conveyor and unbalanced rotor against each other without imparting such forces to the frame. The improved machine herein disclosed operates with almost no vibrations transmitted through the frame of the machine to the floor or other supporting structure.

The term "vibrating conveyor" as used herein may refer to a device including a conveying table having an imperforate surface upon which discrete materials may be placed, the action of the mechanism tending to spread the materials evenly across the surface so that they may be individually inspected, and also refers to a feeding mechanism having a screen or sieve surface onto which discrete materials may be fed and through which small sizes of the particles or the like may be sifted while larger particles or articles are fed onward onto a succeeding mechanism. The present invention is particularly useful in the inspection, sorting and grading of soft fruit such as cherries and berries, the elimination of substantial vertical movement to the feeding element other than that required for feeding movement of such fruit along the conveyor, resulting in elimination of bruising and crushing of the fruit.

While the foregoing relates to a new conveying machine as a whole, the invention also includes new portions which may be used to great advantage in other types of conveying machines. One such portion is the supporting means for this unbalancing rotor, which is itself results in improved performance in prior art mechanisms such as that disclosed in the above-identified Patent No. 2,899,044. Another such portion is the supporting means for the conveying element itself, the use of which results in improved operation in almost any type of prior art conveyor.

The characteristics of the present invention make it particularly suitable for monitoring or proportioning the flow of material from one conveyor to another, so that accurate filling of containers by weight or the like may be accomplished.

The foregoing and other advantages of the present invention may be more readily asecertained by inspection of the accompanying drawings, taken in connection with the following specification, wherein like numerals refer to like parts throughout.

In the drawings:

FIG. 1 is an upwardly looking view, in perspective, of a vibrating conveyor incorporating the present invention, with parts broken away for the purposes of illustration;

FIG. 2 is a partial vertical section taken substantially along line 2—2 of FIG. 1;

FIG. 3 is a partial vertical section taken substantially along line 3—3 of FIG. 1;

Figure 4:
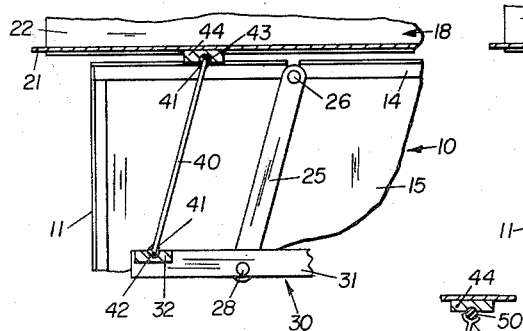
FIG. 4 is a partial vertical section taken substantially along line 4—4 of FIG. 1.

The machine disclosed in FIGS 1 to 4, inclusive, comprises a main frame 10 including vertical angle bars 11 providing legs for the frame, lower channel bars 12 at the sides, lower channel bars 13 at the ends of the frame, and upper angle bars 14 at the sides of the frame. The frame preferably includes side panels 15 and end panels 16 forming a safe enclosure for the working elements of the machine. A conveying element 18 is mounted above the main frame. The conveying element preferably comprises a welded frame, formed of flat longitudinal bars 19 and flat end bars 20, upon which is mounted a conveying surface plate 21 having an upwardly facing surface upon which discrete materials may be supported, and vertically extending side members 22 preventing material from rolling off the side edges of the supporting surface. The plate 21 may be imperforate if it is desired merely to inspect and feed the materials longitudinally of the machine, or may be wholly or partially foraminous for sifting purposes, in which event suitable means (not shown) would be provided to capture the sifted materials.

A plurality of upright equilinear links 25 are suspended from the upper portion of the fixed frame, the suspension being accomplished by means such as laterally projecting pivot pins 26 at the upper ends of the links extending into bearing blocks 27 having upwardly opening slots for reception of the pins 26. The lower ends of the links are pivotally connected by pivots 28 to a longitudinally shiftable subframe 30. The subframe preferably comprises a pair of longitudinally extending side rails 31 connected at their ends by crossbars 32, and the subframe may be suitably braced by other means (not shown). A bracket 33 on one of the crossbars 32 pivotally supports one end of a horizontally extending piston rod 34 which extends into a horizontally extending cylinder 35 pivotally connected to a crossbrace 36 extending between the side channel bars 12. Extension of the piston rod, as illustrated in FIG. 1, moves the subframe 30 to the left so that the links 25 are inclined to the left of the vertical. The cylinder 35 is single-acting and when it is vented a pair of springs 37 tensioned between the bracket 33 and the crossbrace 36 swing the links 25 to the right of the vertical. Suitable control means may be provided to supply operating fluid, or exhaust the operating fluid, to the extent desired to or from the cylinder 35 so as to control the inclination of the links 25. The links may be inclined in either direction within limits of design or may be held vertically. The direction of movement of the subframe 30 is parallel to the direction of feeding motion of the feeding element 18. The conveying element 18 is supported upon such subframe 30 as described below and when oscillating vibratory motion is imparted to the feeding element 18, by means to be described, the amplitude of the feeding component thereof will vary from zero when the links 25 are vertical, to a maximum in either direction depending upon the angle of inclination and direction of the angle of inclination of the links 25. The links 25 and the subframe 30 are freely suspended within the fixed frame, so that there is no friction, other than friction of the small pivots of the links, restraining adjusting movement of the subframe.

The feeding element 18 is supported for oscillating motion upon the subframe 30 by means including a plurality of equilinear thrust members 40 which are equal in length to the links 25 and form parallelograms therewith. Preferably each thrust member 40 comprises a broad, rectangular plate extending parallel to planes radial to axes parallel to the feeding surface of the supporting plate 21 and extending transversely with respect to the direction of oscillating motion of the element 18. Each plate preferably has at its upper and lower ends, respectively, nylon bearing portions 41 providing arcuate end surfaces for the plates. The lower nylon bearing portion of each plate is preferably seated in a lower, upwardly facing groove 42 provided in the crossbar 32 of subframe 30 and having an arcuate inner surface, and each upper nylon bearing portion is received in a similar downwardly facing groove 43 provided in a crossbar 44 fixed to the lower surface of the feeding element 18. The crossbars 32 and 44 comprise thrust transmitting elements whereby the weight of the feeding element 18 and the material thereon is transmitted through the thrust members 40, to the subframe 30. In effect, therefore, the feeding element is suspended from the main frame 10.

It will be appreciated from the foregoing that adjustment of the amplitude and direction of feeding motion is effected without shifting the position of the feeding element 18 either horizontally or vertically with respect to the main frame and with respect to adjacent equipment. In order to keep the feeding element in substantially centered position while permitting oscillating motion to be imparted thereto, the feeding element is resiliently connected to the main frame by a pair of tensioned helical springs 45 at each side of the machine. The springs are inclined toward each other midway of the length of the machine, their upper ends being connected to pins 46 on the side members 22 and their lower ends being connected to pins 47 on the side plates 15. In addition to maintaining the feeding element in substantially longitudinally centered relationship on the main frame, the springs 45 exert a component of force to hold the ends of the thrust members 40 seated in their respective grooves. However, since the grooves 42 and 43 are open, the feeding element 18 would be lifted out of position if an attempt were made to move the equipment about by lifting up on the ends of the feeding element. In order to permit moving without causing collapse of the equipment, a plurality of hook brackets 48 are fixed to each side of the frame 10 and extend over pins 49 on the side elements 22 of the feeding element. The brackets are normally spaced from the pins by slightly more than the maximum extent of vertical movement which may be imparted to the feeding element by the vibrating mechanism, but when the ends of the feeding element 18 are raised the pins 49 engage the hook brackets so that the entire equipment may be shifted about.

Figure 5:
FIG. 5 is a fragmentary view similar to FIG. 4 showing a modified bearing structure.

As shown in FIG. 5, instead of employing nylon bearing members 41 forming part of the plates 40, separate nylon rods 50 may be received in arcuate grooves in the crossbars 32 and 44 and also in similar grooves 51 in the ends of modified plates. While nylon has been mentioned as a preferable bearing material other material having similar properties may be employed.

Figure 6:
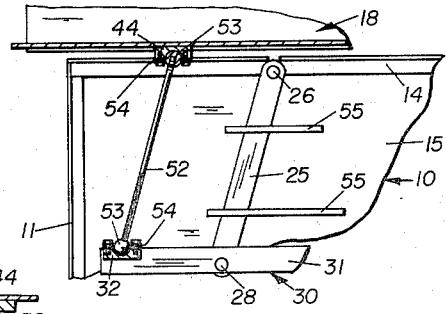
FIG. 6 is a view similar to FIG. 4, showing certain modifications in detail.

A modified form of suspension is illustrated in FIG. 6. In this form the links 25 may be as previously described, but thrust rods 52 replace the thrust plates 40. The ends of the rods 52 are screwed into nylon balls 53 which are seated in semispherical sockets provided in the thrust members 32 and 44. Apertured retainer plates 54 may be provided to hold the balls 53 in their seats while permitting angular displacement of the rods 52. Since the rods 52 cannot prevent side-swaying of the feeding element 18 as the plates 40 do, means are provided to prevent side-swaying, such as by restraining the links 25 in longitudinally slotted guide members 55 mounted on the fixed frame. The functioning of this modification is otherwise exactly the same as previously described.

The improved means for supporting the unbalancing rotor which imparts oscillating motion to the feeding element comprises the following:

An unbalancing rotor 60, such as described and claimed in the above-identified patent and applications, is centrally mounted beneath the conveying element for rotation about a horizontal axis extending transversely with respect to the direction of feeding motion. The rotor is mounted upon an axle 61 which is driven by a pair of pulleys 62 fixed to the opposite ends of the axle, and a pair of belts 64 extending therefrom to a pair of pulleys 65 on the shaft of a double-ended motor 66 which is mounted on a support 67 extending between the longitudinal rails 12 of the main frame. The rotor is journaled on a resilient support assembly comprising the following: A bar assembly, comprising a pair of longitudinally extending bars 70 and a crossbar 71, extends longitudinally of the machine in the direction opposite the direction of the belt 64 from the unbalancing rotor 60. The ends of the bars 70 are provided with semicylindrical, upwardly facing hook portions 72 in which are respectively mounted a pair of resilient bushings 73 made of rubberous material. The hook portions and their bushings are restrained beneath a crossrod 75 connected between the longitudinal channels 12 of the main frame. A pair of heavy helical springs 76 are placed in compression between intermediate portions of the longitudinal bars 70 and a crossbar 77 extending between the channels 12.

The crossbar 71 at the free ends of the bars 70 constitutes a thrust member having an upwardly facing, transverse groove having an arcuate inner surface in which is seated an arcuate nylon bearing member 80 at the lower end of a rectangular thrust plate 81, the upper end of which mounts a similar nylon bearing member 82 seated in a transverse, downwardly facing, arcuate groove in a crossbar 83 of a connecting rod assembly 84. A pair of tensioned coil springs 85 may be connected adjacent the upright edges of the thrust plate 81 so as to hold the ends of the plate in the grooves of the thrust transmitting members 71 and 83. The springs 85 should be slightly shorter than the distance between the pivotal axes of the ends of the thrust plate 81 so as to avoid any over center action as the plate pivots on the members 71 and 83. The crossbar 83 is mounted upon the upper pair of a plurality of forwardly extending bars 86 which extend in the direction of feeding motion back over the bars 70. The forward ends of the bars 86 are connected to a short plate or strap 87 of non-compressible but vertically flexible sheet material, which may be a glass fiber filled polyester member, the forward end of which is connected to a rigid bracket 88 depending from the feeding element 18. The opposite ends of the connecting rod bars 86 mount a pair of journal members 90 journaling the opposite ends of the axle 61 of the unbalancing rotor. Since the conveyor element 18 is not moved horizontally when the subframe 30 is moved to adjust the vibration of the plates 40, the average position of the thrust plate 81 can be vertical at all times.

The assembly, comprising the bars 70 and the springs 76, together with the vertically rigid, horizontally flexible thrust transmitting assembly comprising the thrust plate 81, and the vertically flexible, longitudinally rigid connecting rod assembly 84, permits vertical movement of the unbalancing rotor 60. The unwanted vertical components of motion created by the unbalancing rotor 60 are thereby damped out without imparting such movements to the fixed frame 10. The longitudinally rigid connecting rod assembly, however, transmits the desired horizontal component of motion of the unbalancing rotor to the conveying element 18. Reaction forces due to rapid reversal of such motion are substantially balanced against each other so that horizontal vibration is not imparted to the frame. The horizontal motion of the conveyor and unbalancing rotor is, in general, quite small so that such motion is easily absorbed in the flexible belts 64.

Figure 7:
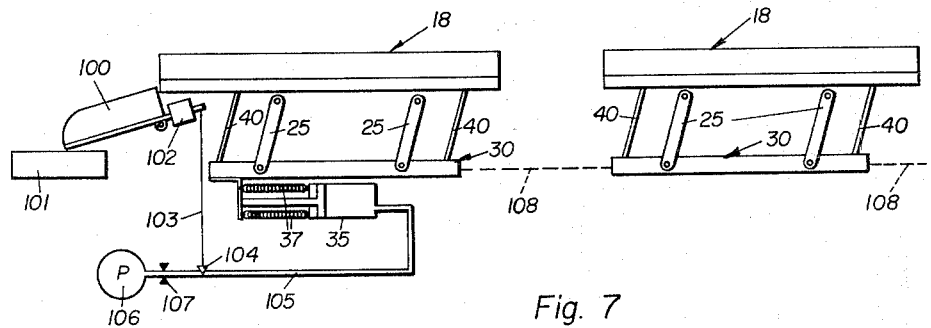
FIGS. 7 and 8 are schematic representations of combinations of vibrating conveyors of the present invention in use.

Useful applications of the present invention are schematically illustrated in FIGS. 6 and 7.

In FIG. 7 an end conveyor moves material into a pivoted control chute 100 which directs the material into a container 101. The chute 100 acts against an adjustable counterbalance 102 so that the positions of the chute about the pivotal axis depend upon the rate of discharge of material being conveyed from the adjacent conveyor. A suitable connection 103 between the dumping chute and a bleed valve 104 in the line 105 leading from the pump 106, or other source of fluid pressure to the cylinder 35 vents the cylinder. An orifice 107 in the line 105 between the source 106 and the valve 104 causes the pressure in the cylinder 35 to drop as the valve 104 opens to discharge fluid from the system so that the springs 37 return the links 25 and thrust members 40 toward the vertical to decrease the feed rate as the weight on the chute 100 increases and vice versa. A mechanical, electrical or fluid servomotor connection indicated schematically by the broken line 108 may connect the subframes 30 of preceding vibrating conveyors in the line so as to adjust the feed rate of the entire flow of material from conveyor to conveyor. It will be apparent that the cylinder 35 can also be employed to stop the feed by moving the movable frame 30 to a position in which the average position of the members 40 is vertical, or to reverse the feed by moving the movable frame 30 to a position in which the average inclination of the members 40 is reversed, under control of suitable sensing devices such as a scale (not shown) under the container 101.

Figure 8:
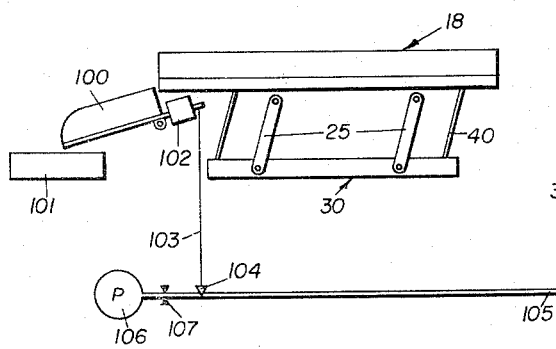

FIG. 8 schematically illustrates another arrangement of use of several conveyors of the present invention. In this modification the dumping chute 100 controls the venting of a cylinder 35 associated with another conveyor. Such an arrangement will maintain the rate of feed over such other conveyor proportional to that of the conveyor having the control chute 100.

Figure 9:
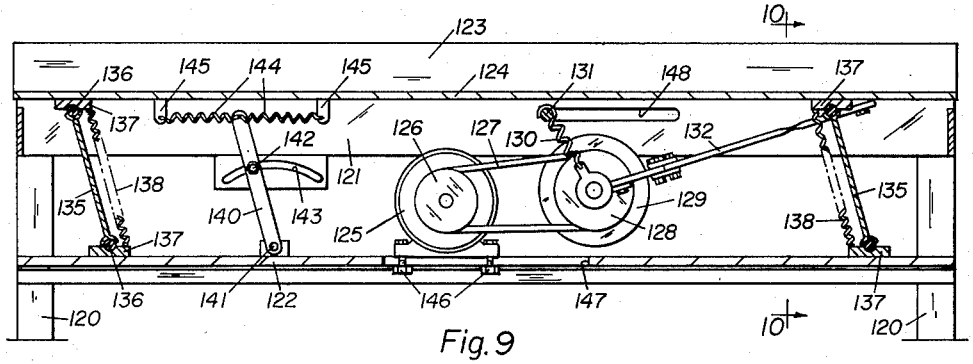
FIG. 9 is a longitudinal, vertical section through a conveying machine such as disclosed and claimed in our prior Patent No. 2,899,044, in which the conveying element is supported by means of the present invention.
Figure 10:
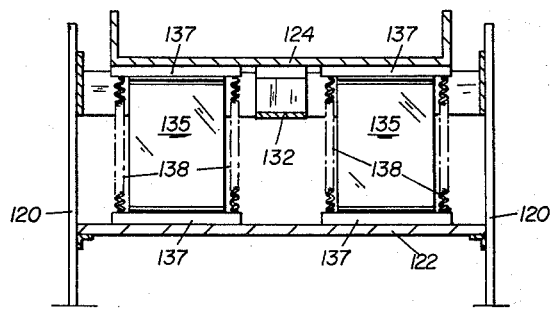
FIG. 10 is a vertical section taken substantially along line 10—10 of FIG. 9.

The conveying machine disclosed in FIGS. 9 and 10 incorporates a form of the thrust transmitting means of the present invention. The machine includes a fixed frame including legs 120, upper longitudinal members 121, and a lower bed 122. A conveying element 123 having an upwardly facing supporting surface 124 is mounted for oscillatory motion in accordance with the present invention. The oscillatory motion is imparted to the conveying element by any suitable means, such as a motor 125 mounted upon the bed, pulley 126 on the motor, belt 127 driven thereby, pulley 128 driven by the belt, and an unbalancing rotor 129 driven by the pulley 128, all as explained in the above-identified patent and applications. The pulley 128 is fixed to the shaft of the unbalancing rotor which is suspended by a spring 130 connected to a crossbar 131 of the fixed frame. A similar belt and pulley arrangement (not shown) connects the opposite end of the motor shaft to the opposite end of the shaft of the unbalancing rotor. A longitudinally rigid, vertically flexible connecting rod 132 connects the unbalancing rotor to the conveying element.

In accordance with the present invention, the conveying element is supported upon the bed 122 by the new thrust transmitting means. The means include pairs of laterally aligned thrust transmitting plates 135 mounted for pivotal motion about axes parallel to the surface 125 and transverse with respect to the direction of feeding motion thereof. Each end of each plate is provided with an arcuate surface comprising a semicylindrical groove adapted to embrace the outer surface of a nylon rod 136 mounted in grooves in thrust transmitting members 137, the lower of which are mounted on the bed and the upper of which are mounted on the conveying element. With each plate there is associated a pair of springs 138, one at each side of each plate, tensioned between the bed and the conveying element and holding the thrust transmitting means in assembled relation as illustrated.

Means are provided to hold the conveying element in substantially centered relation while permitting oscillatory motion to be imparted thereto, comprising a lever 140 pivoted on the fixed frame at 141 and held in desired position by a locking device 142 passing through an arcuate slot 143 on the fixed frame. The upper end of the lever engages the inner ends of a pair of opposed springs 144 extending in the direction of feeding motion, the outer ends of which are fixed to brackets 145 depending from the conveying element. Adjustment of the angle of inclination of the lever 140, accompanied by adjustment of the bolts 146 holding the motor 125 along a slot 147 in the bed, and adjustment of the position of rod 131 along a slot 148 in the fixed frame, will result in adjustment of the angle of inclination and the direction of inclination of the plates 135, thereby adjusting the amplitude of feeding motion and its direction, whereby the rate of feed may be adjusted and the direction of feed reversed if desired. If the plates 135 were as relatively short as the links 39 (FIG. 10) of the above-identified Patent 2,899,044, the amplitude of feeding motion and the direction of feeding could be varied without necessarily changing the position of the motor 125 and rod 131.

The principal advantage of the construction of FIGS. 9 and 10 of this application over the construction of the machine of FIG. 10 of Patent 2,899,044 is as follows: In the patent the links 39 which support the conveying element are secured by laterally extending pivot bolts surrounded by rubber bushings in transverse bores in the links. The rubber bushings were provided to prevent hammering of the several parts against each other, which created noise and wore the parts rapidly. However, the rubber bushings were compressed in their upper portions on the upward motions and in their lower portions on the downward motions at each oscillation of the feeding element, and imposed a period of their own upon the period created by the unbalancing rotor, tending to cancel out the feeding motion at times and to implement it at others, in an irregular manner. The noiseless, incompressible nylon thrust members held in firm contact with the adjacent metal parts at all times by the springs 138 eliminate such errant effects and create a smooth flow of material without any irregularities whatsoever. Thus delicate materials such as fruit and berries are protected from the occasional bumps and jars as the periods of the bushings and unbalancing rotor coincided in the prior machine.

Figure 11:
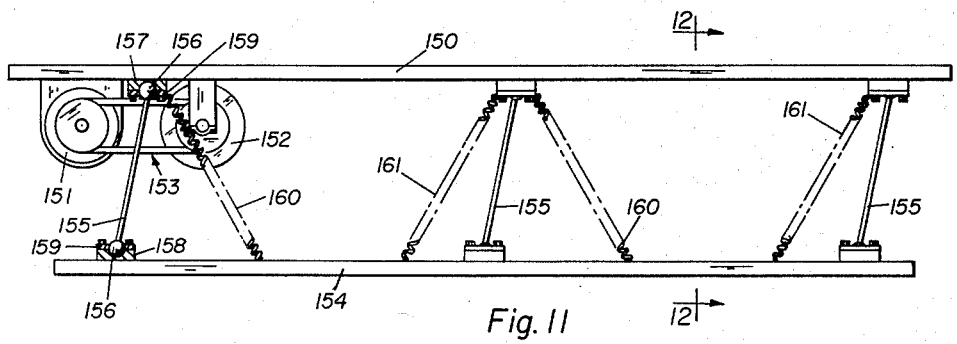
FIG. 11 is a side elevation, partially in section, of another type of conveying mechanism having supporting means of the present invention incorporated therein.
Figure 12:
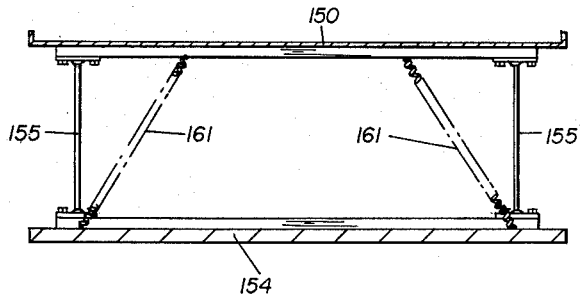
FIG. 12 is a vertical section taken substantially along line 12—12 of FIG. 11.

FIGS. 11 and 12 disclose a method of adapting the supporting members of the present invention to a conveying machine of the prior art which normally embodies upright bar springs extending between a supporting base and an oscillating feeding element. In this modification the feeding element 150 may have oscillating motion imparted thereto by any suitable means, such as the motor 151 driving an unbalancing rotor 152 through pulley and belt means indicated generally at 153, both the motor and the rotor being connected directly to the conveying element. The conveying element is supported upon a fixed frame or support 154 by means of the present invention including a plurality of thrust transmitting rods 155 having arcuate surfaces provided at their ends by nylon balls 156 screwed onto the ends of the rods. Each ball is received in a ball seat in a thrust transmitting member 157 at its upper end, mounted on the conveying element, and 158 at its lower end, mounted upon the bed 154. Apertured cap plates 159 are provided to retain the balls in their seats. The balls are constantly pressed into their seats by a plurality of pairs of springs 160 and 161. The springs 160 are inclined in one longitudinal direction, and the springs 161 are inclined in the opposite longitudinal direction, balancing against each other to maintain the thrust members 155 at the desired inclination. Shifting of the points of attachment of the springs to the base support 154, or substituting springs of other strengths, may be utilized to vary the mean inclination of the members 155, or to shift their inclination to the other side of the vertical for reversing of the direction of feed. Each set of springs is laterally inclined in opposite directions from the vertical so as to maintain the feeding element above the base and hold the thrust members 155 for oscillating motion in vertical planes parallel to the direction of feeding motion. A relatively simple, easily serviced construction is thus provided, having the advantage over the prior art devices that the thrust transmitting members are not subject to bending fatigue. The only members subject to fatigue are the tension springs 160 and 161 which are relatively inexpensive and easily replaced.

In all forms of the invention herein illustrated and described it will be appreciated that the conveying element is supported for oscillatory motion by means including rigid thrust members having their ends engaged with thrust transmitting elements including a nylon member having an arcuate surface seated in an arcuate surface.

Having illustrated and described preferred embodiments of our invention, it should be readily apparent to those skilled in the art that the same permits of modification in arrangement and detail. We claim as our invention all such modifications as come within the true spirit and scope of the following claims.

We claim:

1. A vibrating conveyor comprising a conveying element having an upwardly facing surface for receiving material to be conveyed, a fixed frame, a plurality of equilinear links, a plurality of upper pivots respectively suspending said links from said frame for swinging movements in parallel arcs, a movable frame, a plurality of lower pivots respectively connecting the lower ends of said links to said movable frame, adjustable means interconnecting said frames whereby said movable frame may be adjustably shifted with respect to said main frame in the direction of swinging movement of said links to an extent such that said links may be vertical with respect to said surface or inclined at various angles to either side of the vertical with respect to said surface, a plurality of equilinear thrust members equal in length to said links and supporting said conveying element, means maintaining said thrust members parallel to each other and generally parallel to said links comprising a plurality of lower thrust transmitting members fixed to said movable frame and respectively supporting said thrust members on said movable frame and a plurality of upper thrust transmitting members fixed to said conveying element and respectively engaging the upper ends of said thrust members, said thrust members and said thrust transmitting means permitting arcuate movements of said thrust members in unison with said links, means connected to said conveying element to impart thereto oscillating, vibratory motion having a feeding component in the direction of adjusting movement of said movable frame, the amplitude and direction of said component varying with the inclination of said thrust members and links with respect to said surface, and resilient means biased between said fixed frame and said conveying element providing for said motion of said conveying element and urging said conveying element to a centered position horizontally relative to said fixed frame.

2. The construction of claim 1 in which each of said thrust members comprises a rocker surface at each end thereof and each of said thrust transmitting means is formed to provide a socket receptive of one of said rocker surfaces.

3. The construction of claim 1 in which each of said thrust members comprises a rectangular plate, and each of said thrust transmitting means is formed to provide a groove receptive of an end of one of said plates.

4. The construction set forth in claim 1 in which each of said thrust members comprises a substantially semicylindrical thrust surface at each end, the cylindrical axis of which extends transversely normal to the direction of said feeding component, and each of said thrust transmitting means is provided with a substantially semicylindrical groove of substantially the same diameter and receptive of the respective thrust surface of the thrust member supported thereby.

5. The construction set forth in claim 1 in which each of said thrust members mounts a nylon rod at each end providing a substantially semicylindrical thrust surface, the cylindrical axis of which extends transversely normal to the direction of said feeding component, and each of said thrust transmitting means is formed to provide a substantially semicylindrical groove of substantially the same diameter as the adjacent thrust surface and receptive thereof.

6. The construction of claim 1 in which each of said thrust members is provided with a curved surface at each end and each of said thrust transmitting means is formed to provide a socket receptive of one of said curved surfaces, and in which said resilient means exerts a component of force tending to hold said curved surfaces in said sockets.

7. The construction of claim 1 in which each of said thrust members comprises a plate extending radially from its axis of arcuate movement, each of said thrust transmitting means is formed to provide a groove receptive of an end of one of said plates, and in which said resilient means exerts a component of force tending to hold the ends of said thrust members in said grooves.

8. The construction set forth in claim 1 in which each of said thrust members is provided at each end with a substantially semi-cylindrical thrust surface, the cylindrical axis of which extends transversely normal to the direction of said feeding component, each of said thrust transmitting means is provided with a substantially semi-cylindrical groove of substantially the same diameter as said thrust surfaces and respectively receptive thereof, and said resilient means comprises a pair of opposed springs exerting a component of force tending to hold the ends of said thrust members in said thrust transmitting means.

9. The construction set forth in claim 1 in which each of said thrust members mounts a nylon rod at each end providing a substantially semi-cylindrical thust surface, the cylindrical axis of which extends transversely normal to the direction of said feeding component, and each of said thrust transmitting means is provided with a substantially semi-cylindrical groove snugly receptive of one of said rods, and in which said resilient means exerts a component of force tending to hold said rods in said grooves.

10. The construction set forth in claim 1 in which said means to impart vibratory motion comprises an unbalancing rotor mounted for rotation about a horizontal axis extending transversely with respect to the direction of oscillating motion of said element, a vertically flexible, longitudinally rigid connecting rod assembly extending in the direction of motion of said element, connected at one end to said element and journaling said rotor at its other end, a resilient bar assembly extending in said direction of motion beneath said connecting rod assembly, vertically resilient supporting means for said resilient bar assembly, a vertically rigid, horizontally flexible thrust transmitting assembly supporting said connecting rod assembly on said resilient bar assembly, a motor mounted on said frame, and belt and pulley means drivingly connecting said motor to said rotor.

11. Means to impart vibratory motion to an element mounted for oscillating motion in one direction comprising an unbalancing rotor mounted for rotation about a horizontal axis extending transversely with respect to the direction of oscillating motion of said element, a vertically flexible, longitudinally rigid connecting rod assembly extending in the direction of motion of said element, connected at one end to said element and journaling said rotor at its other end, a resilient bar assembly extending in said direction of motion beneath said connecting rod assembly, vertically resilient supporting means for said resilient bar assembly, a vertically rigid, horizontally flexible thrust transmitting assembly supporting said connecting rod assembly on said resilient bar assembly, a motor, and belt and pulley means drivingly connecting said motor to said rotor.

12. A vibrating conveyor comprising a conveying element having an upwardly facing surface for receiving material to be conveyed, a fixed frame, a movable frame, a plurality of vertically extending parallel first support members of equal length extending between said fixed frame and said movable frame, said members being connected to said frames for pivotal movement about horizontal axes to provide a first parallel linkage system supporting said movable frame on said fixed frame, a plurality of vertically extending parallel second members of equal length extending between said movable frame and said conveying element, said second members being connected to said movable frame and said conveying element for pivotal movement about axes parallel to the first mentioned axes to provide a second parallel linkage system supporting said conveyor element on said movable frame, said first and second members being generally parallel and extending in the same direction from said movable frame, means to hold said conveyor element in an average stationary position horizontally of said fixed frame, means to move said movable frame relative to said fixed frame to adjust the average inclination of said second members, and means between said fixed frame and said conveyor element for imparting vibration movement to said conveyor element having horizontal and vertical components depending upon said inclination.

13. A vibrating conveyor comprising a conveying element having an upwardly facing surface for receiving material to be conveyed, a fixed frame, a plurality of equilinear links, a plurality of upper pivots respectively suspending said links from said fixed frame from swinging movements in parallel arcs, a movable frame, a plurality of lower pivots respectively connecting the lower ends of said links to said movable frame, adjustable means interconnecting said frames whereby said movable frame may be adjustably shifted with respect to said fixed frame in the direction of swinging movement of said links to an extent such that said links may be vertical with respect to said surface or inclined at various angles to either side of the vertical with respect to said surface, a plurality of equilinear thrust members equal in length to said links and supporting said conveying element, means maintaining said thrust members parallel to each other and generally parallel to said links comprising a plurality of lower thrust transmitting members fixed to said movable frame and respectively supporting said thrust members on said movable frame and a plurality of upper thrust transmitting members fixed to said conveying element and respectively engaging the upper ends of said thrust members, said thrust members and said thrust transmitting means permitting arcuate movements of said thust members in unison with said links, means connected to said conveying element to impart thereto oscillating, vibratory motion having a feeding component in the direction of adjusting movement of said movable frame, the amplitude and direction of said component varying with the inclination of said thrust members and links with respect to said surface, and resilient means biased between said fixed frame and said conveying element providing for said motion of said conveying element and holding said conveying element at substantially the same average position relative to said fixed frame, said means for imparting vibration movement including a horizontally extending connecting rod having one end connected to said conveyor element, an unbalanced rotor journaled in the other end of said rod for rotation about an axis extending laterally of said connecting rod, means for supporting said other end of said rod including a support element resiliently mounted on said fixed frame for substantially vertical motion while restrained against horizontal motion and a vertically extending member between said support element and said other end of said rod and connected thereto for pivotal movement about axes parallel to the last mentioned axis, and means to rotate said unbalanced rotor.

14. In a vibrating conveyor having a fixed frame and a conveyor element mounted in said frame for vibration movement having a horizontal component of motion, means for imparting said vibration movement to said conveyor element comprising a horizontally extending connecting rod having one end connected to said conveyor element, an unbalanced rotor journaled in the other end of said rod for rotation about an axis extending laterally of said connecting rod, means for supporting said other end of said connecting rod including a support element resiliently mounted on said fixed frame for substantially vertical motion while being restrained against horizontal motion, and a vertically extending member between said support element and said other end of said rod and connected thereto for pivotal movement about axes parallel to the last mentioned axis, and means to rotate said unbalanced rotor.

15. In a vibratory conveyor including a conveying element having an upwardly facing surface for receiving material to be conveyed, and to which vibratory oscillations having a material feeding component of motion are imparted; means to support said conveying element comprising a lower frame, a plurality of lower thrust transmitting elements on said frame each having an upwardly facing arcuate groove extending transversely with respect to the direction of said feeding component, a plurality of upper thrust transmitting elements on said conveying element each having a downwardly facing arcuate groove extending transversely to the direction of said feeding component, a plurality of nylon rods seated respectively in each of said grooves, a plurality of thrust transmitting plates each having oppositely facing grooves in their opposite ends seated upon and bearing against the respective upper and lower nylon rods, said thrust transmitting plates being equilinear, lying in planes parallel to each other, and inclined with respect to said surface of the feeding element, and a plurality of springs tensioned between said feeding element and said frame and exerting forces holding said nylon rods seated in their respective grooves and said plates seated upon the respective nylon rods.

16. In a vibrating conveyor a floating trough,
a rigid connecting rod,
a vertically flexible strap hingedly connecting one end of the connecting rod to the trough,
an eccentric rotor,
means mounting the rotor rotatably on the connecting rod,
a motor,
means connecting the motor drivingly to the rotor,
and means resiliently supporting the rotor.

17. In a vibratory conveyor including a conveying element having an upwardly facing surface for receiving material to be conveyed, and to which vibratory oscillations having a material feeding component of motion are imparted; means to support said conveying element comprising a lower frame, a plurality of lower thrust transmitting elements on said frame each having an upwardly facing arcuate groove extending transversely with respect to the direction of said feeding component, a plurality of upper thrust transmitting elements on said conveying element each having a downwardly facing arcuate groove extending transversely to the direction of said feeding component, a plurality of nylon rods seated respectively in each of said grooves, a plurality of thrust transmitting plates each having means at their opposite ends engaging and bearing against the respective upper and lower nylon rods, said thrust transmitting plates being equilinear, lying in planes parallel to each other, and inclined with respect to said surface of the feeding element, and a plurality of springs tensioned between said feeding element and said frame and exerting forces holding said nylon rods seated in their respective grooves and said plates in engagement with and bearing against the respective nylon rods.

References Cited by the Examiner
UNITED STATES PATENTS 2,816,453   12/57   Frank.
2,899,044   8/59   Allen _____ 198—220

FOREIGN PATENTS 213,888   9/09   Germany.

SAMUEL F. COLEMAN, *Acting Primary Examiner.*
SAMUEL LEVINE, EDWARD A. SROKA, ERNEST A. FALLER, Jr., *Examiners.*

UNITED STATES PATENT OFFICE
CERTIFICATE OF CORRECTION

Patent No. 3,176,834                        April 6, 1965

Kenneth M. Allen et al.

It is hereby certified that error appears in the above numbered patent requiring correction and that the said Letters Patent should read as corrected below.

Column 2, line 10, for "this" read -- the --; same line 10, for "is" read -- in --; column 5, lines 68 and 69, for "veyor. It will be apparent that the cylinder 35 can also be rate of the entire flow of material from conveyor to con-" read -- rate of the entire flow of material from conveyor to conveyor. It will be apparent that the cylinder 35 can also be --; column 9, line 15, for "thust" read -- thrust --; column 10, line 10, for "from", second occurrence, read -- for --; column 11, line 19, for "conveyor a floating trough" read -- conveyor, a floating conveyor trough --.

Signed and sealed this 17th day of August 1965.

(SEAL)
Attest:

ERNEST W. SWIDER
Attesting Officer

EDWARD J. BRENNER
Commissioner of Patents